United States Patent
Kim et al.

(10) Patent No.: US 11,852,522 B2
(45) Date of Patent: Dec. 26, 2023

(54) METHOD FOR AUTOMATIC SETTING OF SOUND SIGNAL IN AN APPARATUS FOR SPACE MONITORING BY USING SOUND SIGNAL

(71) Applicant: Jae Whan Kim, Seoul (KR)

(72) Inventors: Jae Whan Kim, Seoul (KR); Dong Guk Paeng, Jeju-si (KR); Beom Soo Kim, Seoul (KR); Chang Zhu Jin, Jeju-si (KR)

(73) Assignee: Jae Whan Kim, Seoul (KR)

( * ) Notice: Subject to any disclaimer, the term of this patent is extended or adjusted under 35 U.S.C. 154(b) by 0 days.

(21) Appl. No.: 17/406,032

(22) Filed: Aug. 18, 2021

(65) Prior Publication Data

US 2023/0058957 A1    Feb. 23, 2023

(51) Int. Cl.
*G01H 3/08* (2006.01)
*H04R 3/00* (2006.01)

(52) U.S. Cl.
CPC .............. *G01H 3/08* (2013.01); *H04R 3/00* (2013.01)

(58) Field of Classification Search
CPC .................................... G01H 3/08; H04R 3/00
See application file for complete search history.

(56) References Cited

U.S. PATENT DOCUMENTS

| | | | |
|---|---|---|---|
| 6,760,451 B1 * | 7/2004 | Craven | H03G 5/005 |
| | | | 381/59 |
| 2012/0087211 A1 | 4/2012 | Lee | |
| 2013/0250729 A1 | 9/2013 | Park | |
| 2017/0016797 A1 | 1/2017 | Park | |

FOREIGN PATENT DOCUMENTS

| | | |
|---|---|---|
| KR | 10-2013-0108033 | 10/2013 |
| KR | 10-2016-0090056 | 7/2016 |
| KR | 10-2017-0010170 | 1/2017 |
| KR | 10-2017-0046980 | 5/2017 |

OTHER PUBLICATIONS

PCT ISR dated Oct. 11, 2022.

* cited by examiner

*Primary Examiner* — Andrew L Sniezek

(57) ABSTRACT

A method of automatically setting an acoustic signal of a device for space monitoring by using the acoustic signal is proposed. The proposed is a technology for automatically setting the acoustic signal emitted from the device for space monitoring by using the acoustic signal for more precise measurement.

17 Claims, 14 Drawing Sheets

METHOD FOR AUTOMATIC SETTING OF SOUND SIGNAL IN AN APPARATUS FOR SPACE MONITORING BY USING SOUND SIGNAL

BACKGROUND OF THE INVENTION

Field of the Invention

The present disclosure relates to a method of automatically setting an acoustic signal of a device for space monitoring by using the acoustic signal and, more particularly, to a technology for automatic setting of an acoustic signal for more precise measurement by using the acoustic signal being emitted from a device for space monitoring.

Description of the Related Art

Various detection sensors and devices are used to detect incidents such as an intrusion of an outsider in an indoor space, a fire occurrence, or a gas leak. Recently, with the development of IoT technologies, systems that may detect, from a remote location, various situations such as whether heating or cooling is operated in an indoor space and whether a window is open, and be able to take follow-up actions accordingly are being implemented.

In general, a CCTV, an IR camera, a vibration detection sensor, a gas detection sensor, and the like are applied to such various detection technologies. In the case of the related art, since individual sensing devices are necessary for each situation regarding the intrusion, fire, gas leakage, and the like, a large number of sensing devices are required to that extent in order to monitor various indoor space situations, and accordingly a significant amount of money is spent on constructing corresponding equipment, and also power consumption is a considerable problem.

Recently, in order to solve the above problems, a technique for emitting an acoustic signal and identifying a situation of an indoor space on the basis of a change in the acoustic signal received back from the indoor space has been proposed.

As one of the devices for detecting a spatial situation on the basis of the acoustic signal, there is provided a sound field sensor. The sound field sensor (SOFIS) is a device that emits sound (i.e., acoustic signal) of various frequencies, analyzes a change in a sound field formed in a predetermined space, and measures object movement, air flows, and temperature changes in the predetermined space.

In order to analyze the change in the sound field, the sound field sensor emits an acoustic signal into the predetermined space and performs a digital signal processing to convert sound of various frequencies collected through a microphone or the like into a sound pressure spectrum.

FIG. 1 is a graph illustrating an example of a sound pressure spectrum measured by a sound field sensor at time t1, and FIG. 2 is a graph illustrating the sound pressure spectrum at time t1 and a sound pressure spectrum at t2 after t1 together, which are measured by the sound field sensor.

The sound pressure spectrum may be illustrated as a graph in which a horizontal axis represents frequencies and a vertical axis represents sound pressure levels (or sound pressure values) as shown in FIGS. 1 and 2 above.

Detection of various spatial situations such as the object movement, air flows, temperature changes, and the like may be performed by measuring and analyzing a shift in the horizontal direction, that is, frequency shift S, in the graph illustrating the sound field spectrums as shown in FIG. 2.

Therefore, the precise measurement of a frequency shift may be important in order to accurately detect spatial situations such as the object movement, air flows, and temperature changes.

The precision of a frequency shift may be improved as a difference between a maximum value MAX and a minimum value MIN of sound pressure values that changes depending on the frequency increases. For example, in a case of a sound pressure spectrum expressed as a generally flat curve due to a small difference between the maximum and minimum values of sound pressure levels, it is difficult to accurately measure a degree of the frequency shift even when the sound pressure spectrum is shifted, so it is difficult to identify precisely a spatial situation on the basis of the degree of the shift. As an extreme example, when a sound pressure spectrum is expressed as a single horizontal line because there is no change in a sound pressure value depending on a frequency, it is impossible to measure a magnitude of a shift even when the shift of the sound pressure spectrum actually occurs. Therefore, it is necessary to appropriately adjust an emitted acoustic signal, so that the difference between the maximum and minimum values of the sound pressure levels has a value greater than or equal to a certain value.

Furthermore, in the above description, from a viewpoint of securing the difference between the maximum and minimum values of the sound pressure values, it is described that the emitted acoustic signal should be appropriately adjusted, but in addition to the difference between the maximum and minimum values of the sound pressure values, various criteria may be applied to optimize the emitted acoustic signal.

However, even though the emitted acoustic signal is optimized by applying at least one or more determination criteria, the previously set acoustic signal may be changed from the optimized state thereof to an non-optimal acoustic signal due to changes of various factors including: a change happened when arrangement of furniture or equipment in a space to be monitored is changed; a change happened when a location or orientation of a device for space monitoring is changed; and a change happened when the temperature changes due to the change of season. Therefore, when various factors such as the shape of the space to be monitored, the arrangement of furniture or equipment, the temperature, and the location and/or orientation of the device for space monitoring are changed, it is necessary to reset the emitted acoustic signal accordingly to an appropriate acoustic signal.

It is very cumbersome to manually reset the acoustic signal each time according to the changes of various factors as described above, and in particular, it is difficult for a non-expert general user to reset the acoustic signal to the appropriate acoustic signal.

SUMMARY OF THE INVENTION

The present disclosure has been prepared to solve the problems of the related art as described above, and an objective of the present disclosure is to solve the inconvenience of having to reset an appropriate acoustic signal each time according to various factors such as the shape of the target space, the installation position of the device for space monitoring, and the changes of arrangement of fixed objects in the target space, when a spatial situation is detected through a device for space monitoring using the acoustic signal.

In particular, another objective of the present disclosure is to solve the problem in which it is difficult for a non-expert general user to directly identify and reset an acoustic signal suitable for a target space.

The objectives of the present disclosure are not limited to the above, and other objectives and advantages of the present disclosure not mentioned can be understood by the following description.

An exemplary embodiment of a method of automatically setting an acoustic signal of a device for space monitoring according to the present disclosure includes: emitting the acoustic signal, wherein the acoustic signal is emitted to a target space for monitoring; receiving the acoustic signal, wherein the acoustic signal of the target space is received; measuring a spatial frequency response, wherein the spatial frequency response is measured on the basis of the received acoustic signal; determining reset of the acoustic signal, wherein the measured spatial frequency response is determined on the basis of preset determination conditions so that whether to reset the acoustic signal to be emitted is determined; and resetting the acoustic signal, wherein the acoustic signal to be emitted is changed and reset according to the determining of the reset of the acoustic signal.

As an example, in the determining of the reset of the acoustic signal, the determination conditions may include at least one or more of measurement stability, spectral variability, frequency resolution adequacy, or distinguishability from noise.

As an example of a determination condition of measurement stability, the emitting of the acoustic signal to the measuring of the spatial frequency response may be iteratively performed, and in the determining of the reset of the acoustic signal, whether to reset the acoustic signal by evaluating the measurement stability is determined on the basis of similarity between a plurality of spatial frequency responses, which is iteratively measured.

As an example of a determination condition of spectral variability, in the determining of the reset of the acoustic signal, a difference between maximum and minimum values or a degree of scattering of the measured spatial frequency response may be compared with a reference range, so as to evaluate the spectral variability, thereby determining whether to reset the acoustic signal.

As an example of a determination condition of frequency resolution adequacy, in the determining of the reset of the acoustic signal, whether to reset the acoustic signal may be determined by evaluating the frequency resolution adequacy on the basis of slopes of a spectrum waveform, in the measured spatial frequency response.

As an example of a determination condition of distinguishability from noise, in the determining the reset of the acoustic signal, whether to reset the acoustic signal may be determined by evaluating the distinguishability from the noise through comparing the measured spatial frequency response with a previously obtained spatial frequency response or the noise measured without the emitted acoustic signal.

Further, in the resetting of the acoustic signal, the acoustic signal to be emitted may be reset by adjusting at least one or more of a frequency of an emission start point, a frequency of an emission end point, or a duration of acoustic signal emission with respect to a monotone sound acoustic signal.

Alternately, in the resetting of the acoustic signal, the acoustic signal to be emitted may be reset by adjusting at least one or more of a frequency interval, a center frequency, or the number of frequencies with respect to the acoustic signal of a synthesized sound composed of a frequency set comprising a plurality of frequency components.

Moreover, the emitting of the acoustic signal to the measuring of the spatial frequency response may be performed for each of a plurality of retained acoustic signals, and the determining of the reset of the acoustic signal may include: calculating a performance value for each acoustic signal on the basis of at least one or more determination conditions among measurement stability, spectral variability, frequency resolution adequacy, or distinguishability from noise existing in the target space in the spatial frequency response measured corresponding to each acoustic signal; and determining whether to reset the acoustic signal to be emitted in comparison with the performance value for each acoustic signal.

In addition, another exemplary embodiment of a method of automatically setting an acoustic signal of a device for space monitoring includes: emitting the acoustic signal, wherein the acoustic signal is emitted to a target space for monitoring; receiving the acoustic signal, wherein the acoustic signal of the target space is received; determining reset of the acoustic signal, wherein the received or real-time received acoustic signal is determined on the basis of preset determination conditions so that whether to reset the acoustic signal to be emitted is determined; and resetting the acoustic signal, wherein the acoustic signal to be emitted is changed and reset according to the determining of the reset of the acoustic signal.

According to the present disclosure as described above, an acoustic signal may be automatically reset to reach optimal detection performance in consideration of various factors such as the shape of the target space, the installation location of the device for space monitoring, and the changes in arrangement of fixed objects in the target space.

In particular, there is an effect that the acoustic signal capable of exhibiting optimal performance may be automatically set by solving the problem in which it is difficult for the user to identify the appropriate acoustic signal.

The situation of the target space may be more precisely detected through the automatic resetting of such an acoustic signal.

The effects of the present disclosure are not limited to the above-mentioned effects, and other objectives that are not mentioned will be clearly understood by those skilled in the art from the following description.

DETAILED DESCRIPTION OF THE INVENTION

Figure 1:
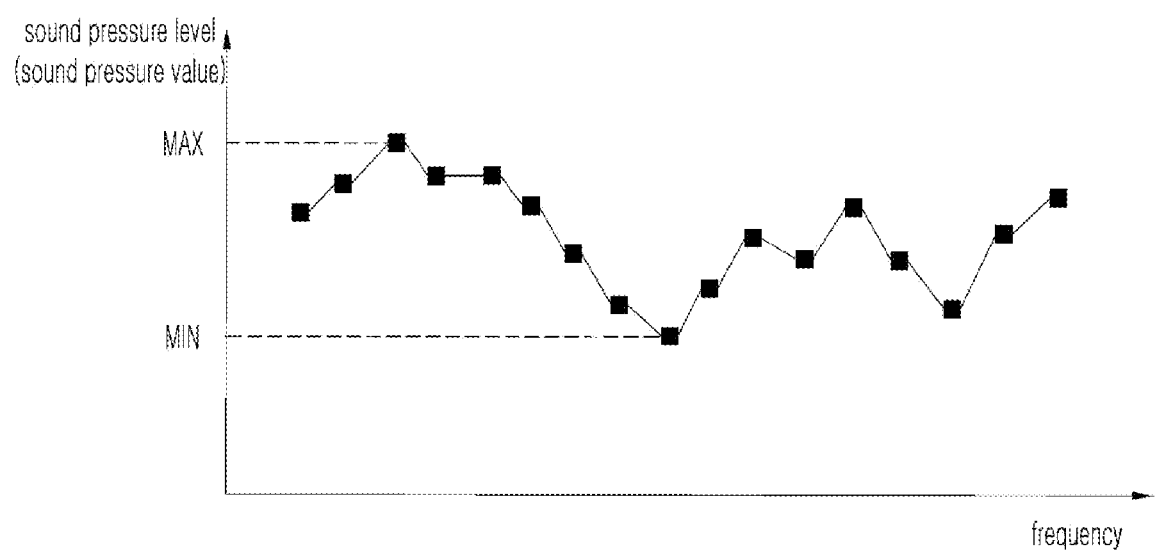
FIG. 1 is a graph illustrating an example of a sound pressure spectrum measured by a sound field sensor at time t1.
Figure 2:
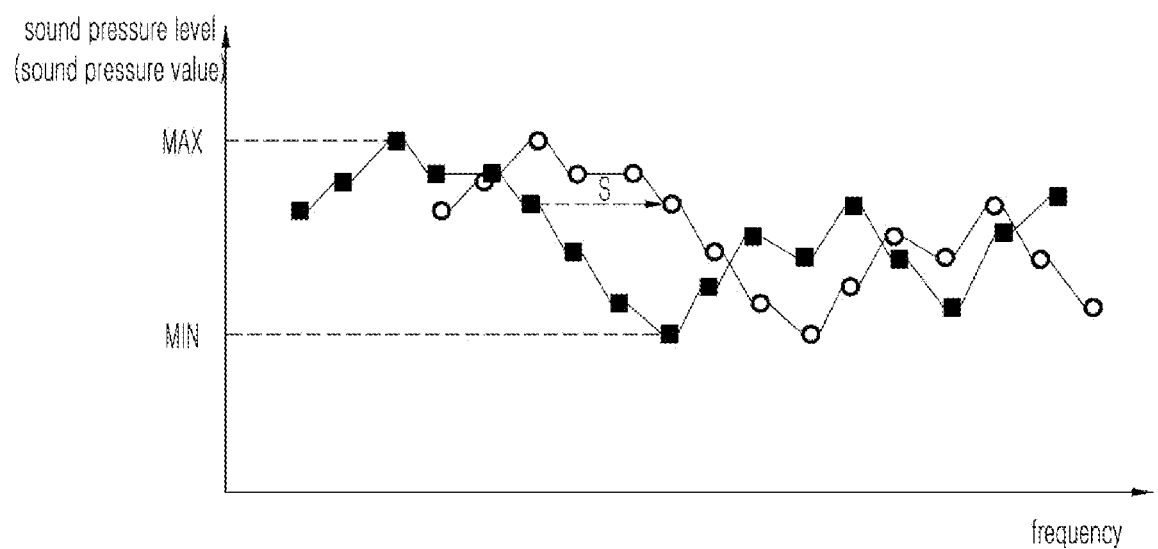
FIG. 2 is a graph illustrating the sound pressure spectrum at time t1 and a sound pressure spectrum at t2 after t1 together, which are measured by the sound field sensor.

Hereinafter, preferred exemplary embodiments of the present disclosure will be described in detail with reference to the accompanying drawings, but the present disclosure is not limited or restricted by the exemplary embodiments.

In order to describe the present disclosure, an operational advantage of the present disclosure, and the objective achieved by the implementation of the present disclosure, hereinafter, preferred exemplary embodiments of the present disclosure will be illustrated, and are described with reference to the preferred exemplary embodiments.

First, the terms used in the present application are used only to describe specific exemplary embodiments, and are not intended to limit the present disclosure; and expression in the singular may include the plural unless the context clearly indicates otherwise. In addition, it will be further understood that the terms "comprise", "include", "have", etc. when used in the present application, specify the presence of features, integers, steps, operations, elements, components, and/or combinations thereof stated in the specification, but do not preclude the possibility of the presence or addition of one or more other features, integers, steps, operations, elements, components, and/or combinations thereof.

In the following description of the present disclosure, detailed descriptions of related known functions and components incorporated herein will be omitted when it is determined that the subject matter of the present disclosure may be obscured thereby.

The present disclosure discloses a method of automatically setting an emitted acoustic signal for more precise measurement in a device for space monitoring using the acoustic signal.

The device for space monitoring to which the present disclosure is applied may determine a spatial situation on the basis of a spatial frequency response measured by emitting an acoustic signal to a target space and receiving the acoustic signal of the target space.

The spatial frequency response referred to in the present disclosure may be described as follows. When a target space is regarded as a kind of closed circuit and an acoustic signal is emitted as an input signal to the target space before receiving the acoustic signal as an output signal, factors such as sound pressure for each frequency or phase for each frequency of the received acoustic signal may be defined as "spatial frequency response".

An example of expressing such a spatial frequency response may be graphically displayed as a frequency on a horizontal axis and as sound pressure of the received sound on a vertical axis, and instead of the sound pressure component, a phase component may be displayed on the vertical axis.

Since a spatial frequency response changes depending on physical characteristics of a space, physical conditions of the space may be inferred by using the spatial frequency response, and furthermore, a change in the physical characteristics of the space may be detected by using a pattern in which the spatial frequency response changes. In this case, the greater a difference in the spatial frequency response due to a difference in the physical characteristics of the space, or the greater a magnitude of change in the spatial frequency response due to the change in the physical characteristics of the space, the more precisely the physical conditions of the space may be detected by using the spatial frequency response.

Figure 3:
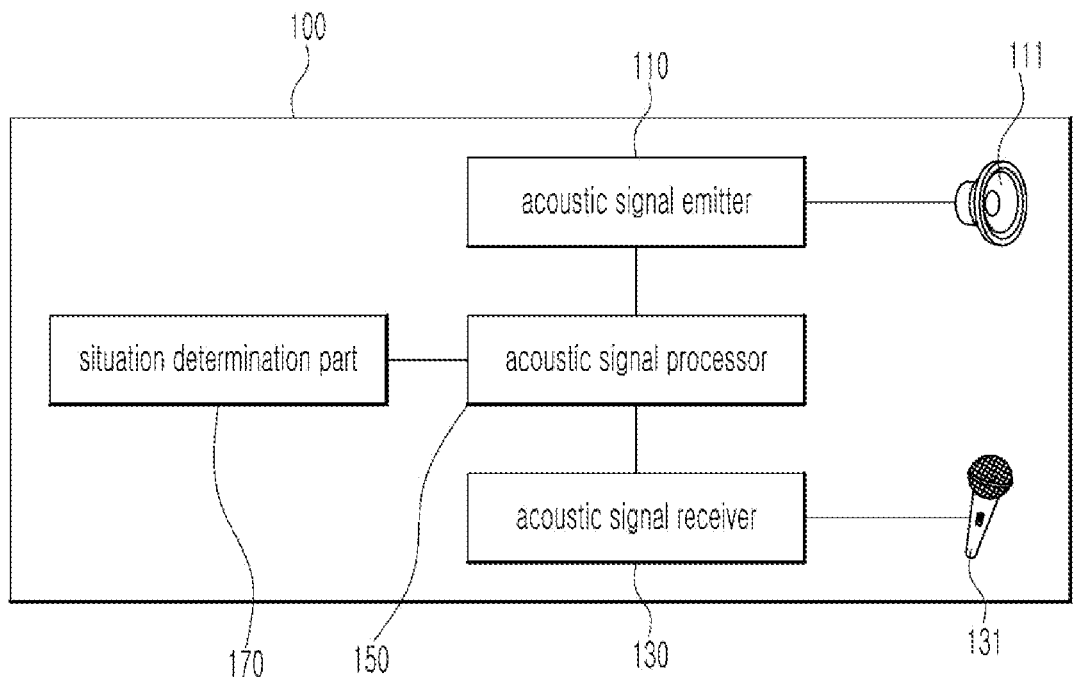
FIG. 3 is a configuration diagram illustrating an exemplary embodiment of a device for space monitoring for realizing a method of automatically setting an acoustic signal according to the present disclosure.

FIG. 3 is a configuration diagram illustrating an exemplary embodiment of a device for space monitoring for realizing a method of automatically setting an acoustic signal according to the present disclosure.

The device 100 for space monitoring to which the present disclosure is applied may include: an acoustic signal emitter 110, an acoustic signal receiver 130, an acoustic signal processor 150, a situation determination part 170, and the like.

The acoustic signal emitter 110 including a speaker 111 or the like may emit an acoustic signal to a target space. The acoustic signal emitter 110 may emit a monotone sound acoustic signal whose frequency changes with time, emit an acoustic signal of a synthesized sound composed of a frequency set including a plurality of frequency components, emit an acoustic signal of a synthesized sound composed of a plurality of frequency sets whose frequencies change with time, and emit an acoustic signal in which the monotone sound acoustic signal and the synthesized sound are alternated.

In addition, the acoustic signal emitter 110 may emit an acoustic signal through one speaker, or may emit acoustic signals through a plurality of speakers. When emitting the acoustic signals through the plurality of speakers, the same acoustic signals may be emitted or acoustic signals different from each other may be emitted.

The acoustic signal receiver 130 including a microphone 131 or the like may receive an acoustic signal from a target space. The acoustic signal receiver 130 may receive the acoustic signal through one microphone or may receive acoustic signals through a plurality of microphones. In addition, the acoustic signal receiver 130 may include various measurement devices capable of measuring sound pressure, sound intensity, and the like.

The acoustic signal processor 150 may provide an acoustic signal to be emitted to a target space to the acoustic signal emitter 110. In addition, the acoustic signal processor 150 may receive the acoustic signal received by the acoustic signal receiver 130 and reset the acoustic signal to be emitted so as to obtain optimal detection performance in consideration of various factors of the target space.

The situation determination part 170 may determine a situation of the target space on the basis of the spatial frequency response. When various changes of situations regarding object movement, temperature changes, air flows, and the like occur in the target space, the received acoustic signal is changed accordingly, and the spatial frequency response measured by using the received acoustic signal is also changed.

The situation determination part 170 may determine what type of situation has changed in the target space by using whether the measured spatial frequency response changes or not, a degree of change, a change pattern, and the like.

The present disclosure may automatically set the acoustic signal to be emitted to the target space so that the optimal detection performance may be exhibited in monitoring the target space through the device for space monitoring.

Figure 4:
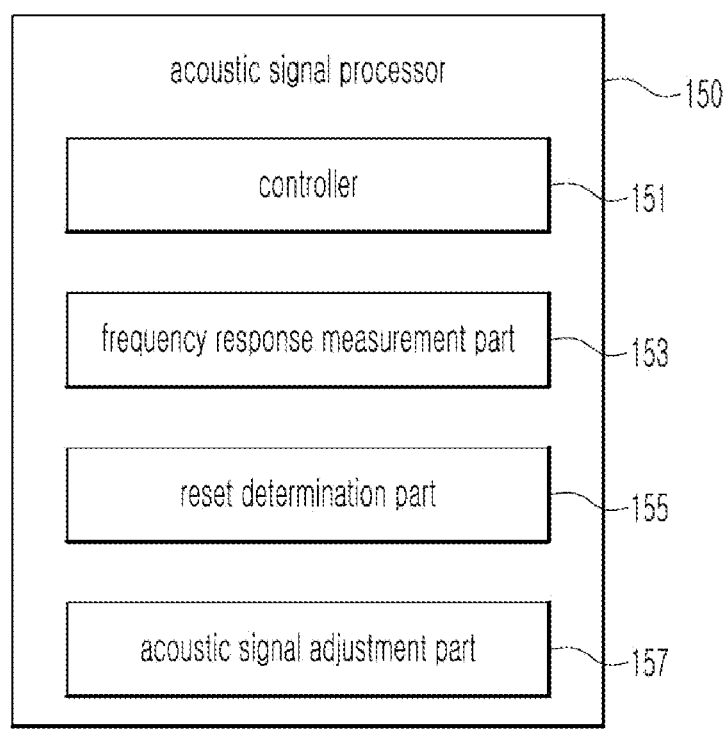
FIG. 4 is a configuration diagram illustrating an exemplary embodiment of an acoustic signal processor of the device for space monitoring that implements the present disclosure.

FIG. 4 is a configuration diagram illustrating an exemplary embodiment of an acoustic signal processor of the device for space monitoring that implements the present disclosure.

The acoustic signal processor 150 may include: a controller 151, a frequency response measurement part 153, a reset determination part 155, an acoustic signal adjustment part 157, and the like.

The controller 151 may control the acoustic signal emitter 110 to emit an acoustic signal to a target space, and control the acoustic signal receiver 130 to receive the acoustic signal from the target space.

The frequency response measurement part 153 may measure a spatial frequency response on the basis of the acoustic signal received by the acoustic signal receiver 130. The frequency response measurement part 153 may transform the received acoustic signal into a frequency domain by using a Fourier transform algorithm or a fast Fourier transform algorithm, so as to measure the spatial frequency response. As an example, a sound pressure spectrum may be identified by transforming the received acoustic signal into a sound pressure value in the frequency domain.

The reset determination part 155 may determine whether to reset the acoustic signal to be emitted by determining the received acoustic signal or the measured spatial frequency response on the basis of preset determination conditions.

Preferably, the reset determination part 155 may determine whether to reset an acoustic signal on the basis of the reset determination conditions of the acoustic signal to be emitted when a preset event occurs. As an example, various cases may be set as events for determining whether to reset the acoustic signal, the cases including: a case when there is a user's request to reset the acoustic signal; a case when initial power is supplied to start operation of the device 100 for space monitoring; a case when a period of a regular time interval arrives; a case when it is suspected that the operation of the device 100 for space monitoring is unstable; a case when new noise is introduced into a target space; a case when spatial characteristics are changed, such as a change in arrangement of a fixed object in the target space; and the like.

Furthermore, while the device 100 for space monitoring emits the acoustic signal to perform monitoring on the target space, whether to reset the acoustic signal may be determined in an unmonitored time band, which is an interval time band between periodic monitoring operation time bands. For example, by dividing the time band in units of one second, the target space monitoring operation and the acoustic signal reset determination may be alternately performed.

The reset determination part 155 may determine whether to reset the acoustic signal by determining the received acoustic signal or the measured spatial frequency response on the basis of various determination conditions including: measurement stability, spectral variability, frequency resolution adequacy, or distinguishability from noise existing in the target space. That is, while receiving the acoustic signal, the reset determination part 155 may determine whether to reset the acoustic signal by determining the acoustic signal itself in a time domain on the basis of various determination conditions, or determine whether to reset the acoustic signal by transforming the received acoustic signal into a signal in the frequency domain and then determining the measured spatial frequency response on the basis of various determination conditions.

Furthermore, the reset determination part 155 may have a plurality of acoustic signals different from each other, calculate performance values according to determination conditions for each acoustic signal, and select the most optimal acoustic signal by comparing the calculated performance values. To this end, the reset determination part 155 may retain: a plurality of acoustic signals different from each other and composed of a monotone sound whose frequency changes with time; a plurality of acoustic signals different from each other and composed of a synthesized sound composed of a frequency set including a plurality of frequency components; a plurality of acoustic signals different from each other and composed of a synthesized sound composed of a plurality of frequency sets whose frequencies change with time; and a plurality of acoustic signals different from each other, wherein the monotone sound acoustic signal and the synthesized sound are alternated.

The acoustic signal adjustment part 157 may adjust and reset the acoustic signal to be emitted on the basis of determination result of the reset determination part 155.

When the acoustic signal to be emitted is the monotone sound acoustic signal whose frequency changes with time, the acoustic signal adjustment part 157 may reset the acoustic signal to be emitted by adjusting at least one or more of a frequency of an emission start point, a frequency of an emission end point, and a duration of acoustic signal emission.

Alternatively, when the acoustic signal to be emitted is the acoustic signal of the synthesized sound composed of the frequency set including the plurality of frequency components, the acoustic signal adjustment part 157 may reset the acoustic signal to be emitted by adjusting at least one or more of a frequency interval, a center frequency, and the number of frequencies.

Furthermore, when the reset determination part 155 has the plurality of acoustic signals different from each other and selects an acoustic signal having optimal performance from among the retained acoustic signals, the acoustic signal adjustment part 157 may receive the selected acoustic signal from the reset determination part 155 and reset the received acoustic signal as the acoustic signal to be emitted.

The acoustic signal that is reset by the acoustic signal adjustment part 157 is provided to the controller 151, and the controller 151 may control the acoustic signal emitter 110 to emit the reset acoustic signal to the target space.

The present disclosure proposes the method of automatically setting the acoustic signal emitted for more precise measurement when the device for space monitoring monitors the spatial situation of the target space by using the acoustic signal. Hereinafter, the method of automatically setting the acoustic signal according to the present disclosure will be described.

The method of automatically setting the acoustic signal according to the present disclosure may include: a first method of determining whether to reset an acoustic signal on the basis of a measured spatial frequency response; and a second method of determining whether to reset the acoustic signal by using the acoustic signal itself received from the time domain.

Figure 5:
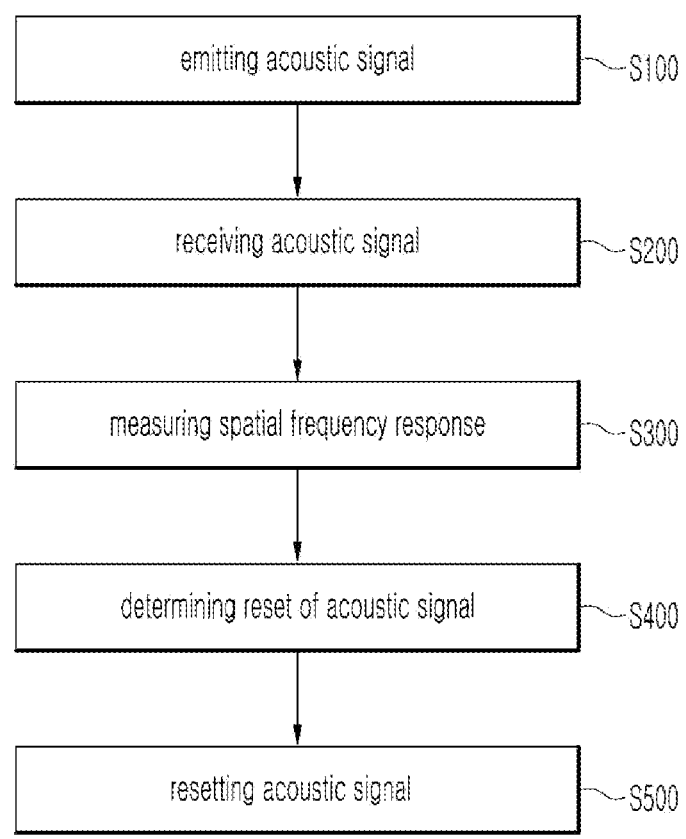
FIG. 5 is a flowchart illustrating an exemplary embodiment for the method of automatically setting the acoustic signal according to the present disclosure.

First, in relation to the first method, FIG. 5 illustrates a flowchart of the exemplary embodiment of the method of automatically setting the acoustic signal according to the present disclosure.

In step S100, the device 100 for space monitoring may emit an acoustic signal to a target space to be monitored, and in step S200, may receive the acoustic signal of the target space. The acoustic signal emitted in step S100 may be an acoustic signal used for monitoring the target space thereafter. Alternatively, the emitted acoustic signal may also be a test acoustic signal for identifying noise in the target space, a shape of the target space, and arrangement positions of fixed objects arranged in the target space.

The acoustic signal may be the monotone sound acoustic signal whose frequency changes with time; the acoustic signal of the synthesized sound composed of the frequency set including the plurality of frequency components; the acoustic signal of the synthesized sound composed of the plurality of frequency sets whose frequencies change with time; and the acoustic signal in which the monotone sound acoustic signal and the synthesized sound alternate.

In step S300, the device 100 for space monitoring may receive the acoustic signal of the target space to measure the spatial frequency response, and in step S400, may determine whether to reset the acoustic signal to be emitted to the target space, according to preset determination conditions on the basis of the measured spatial frequency response. Here, in the determination conditions for resetting the acoustic signal, various determination conditions may be alternatively selected and set, the determination conditions including the measurement stability for the measured spatial frequency response, spectral variability, frequency resolution adequacy, distinguishability from noise existing in the target space, or the like.

In a case where it is not necessary to reset the acoustic signal to be emitted to the target space, the device 100 for space monitoring may maintain the existing acoustic signal to continue to detect a situation for the target space. In a case where it is determined that resetting of the acoustic signal to be emitted to the target space is required, in step S500, the device 100 for space monitoring may change and reset the acoustic signal to be emitted to the target space on the basis of the reset determination result. After that, the device 100 for space monitoring may perform detecting of the situation on the target space with the changed acoustic signal.

As described above, in the present disclosure, the acoustic signal may be automatically set in order to improve performance of detecting the situation of the target space. A process of determining whether to reset the acoustic signal will be described with reference to a specific exemplary embodiment.

Figure 6:
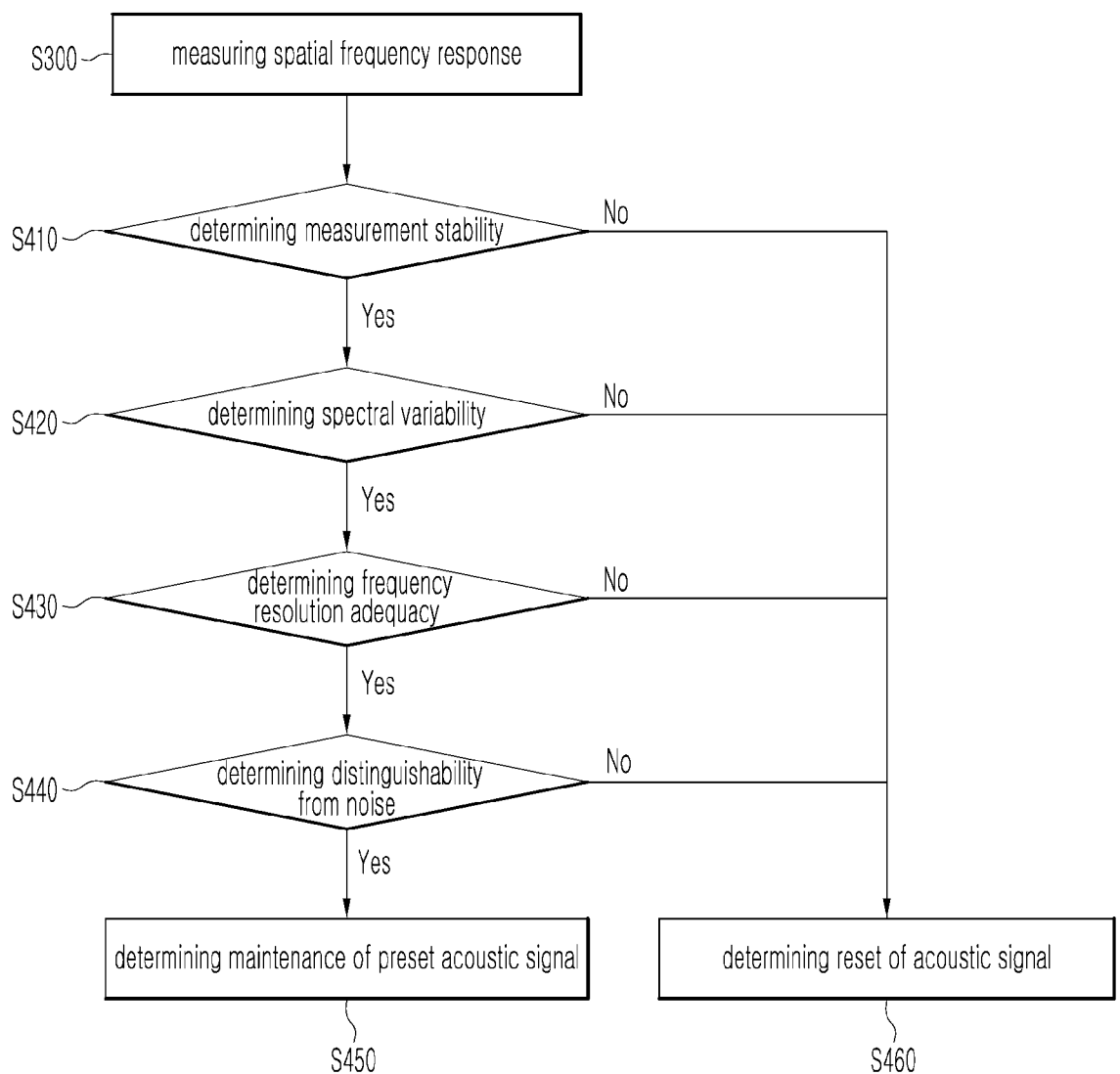
FIG. 6 is a flowchart illustrating an exemplary embodiment of a process of determining reset of the acoustic signal in the method of automatically setting the acoustic signal according to the present disclosure.

FIG. 6 is a flowchart illustrating an exemplary embodiment of a process of determining reset of the acoustic signal in the method of automatically setting the acoustic signal according to the present disclosure.

In step S300, the device 100 for space monitoring measures a spatial frequency response on the basis of the received acoustic signal. As an example, the device 100 for space monitoring may measure the spatial frequency response in the frequency domain by transforming the received acoustic signal to the frequency domain through a Fourier transform (FT) or a fast Fourier transform (FFT).

As another example, when a monotone sound acoustic signal whose frequency changes with time is emitted, since a specific single frequency sound is emitted at a specific time, the device 100 for space monitoring may measure a spatial frequency response by directly transforming a sound pressure value or phase value measured according to an emission time into the sound pressure value or phase value according to an emission frequency. That is, in this case, since the sound pressure value according to the frequency is measured in almost real time, a separate Fourier transform is not required.

As described above, the spatial frequency response may be expressed by components such as the sound pressure by frequency or the phase by frequency of the received acoustic signal. As an example, the frequency may be graphically displayed as the horizontal axis and the sound pressure as the vertical axis.

Hereinafter, for the convenience of explanation, a spectrum according to a sound pressure change by frequency will be described with respect to a spatial frequency response as an example, but the spatial frequency response is not limited to the sound pressure change by frequency in the present disclosure.

In step S300, when a spatial frequency response is measured, in step S450, whether to maintain the previously set acoustic signal may be determined, or in step S460, whether to reset the previously set acoustic signal to new acoustic signal due to deterioration of the detection performance of the previously set acoustic signal may be determined, on the basis of the spatial frequency response, through checking various determination conditions such as determination of measurement stability in step S410, determination of spectral variability in step S420, determination of frequency resolution adequacy in step S430, and determination of distinguishability from noise in step S440.

Here, execution order of each determination condition may be changed, and depending on a situation, only a specific determination condition may be selected to determine whether to reset the acoustic signal.

Each determination condition will be described in more detail through exemplary embodiments.

Figure 7:
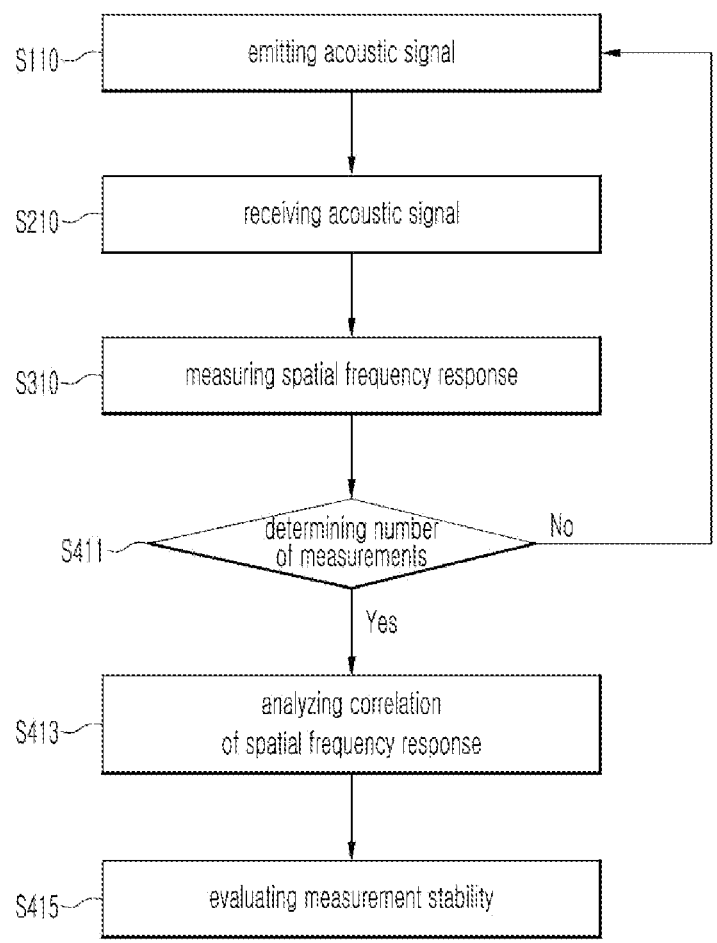
FIG. 7 is a flowchart illustrating an exemplary embodiment of a determination condition of measurement stability in the method of automatically setting the acoustic signal according to the present disclosure.

FIG. 7 is a flowchart illustrating an exemplary embodiment of a determination condition of measurement stability in the method of automatically setting the acoustic signal according to the present disclosure.

In selecting an acoustic signal, when there is no change of the situation in the same target space, it may be said that the stability of the device for space monitoring is secured only when the spatial frequency response is similarly measured within a predetermined level range. When the spatial frequency responses are measured differently even though there is no change of the situation in the same target space, the reliability of the device for space monitoring may be lost. However, the reliability of the device for space monitoring or the measurement stability may be changed according to, for example, the frequency of the emitted acoustic signal, and the like. Therefore, in the present disclosure, the stability of the device for space monitoring is to be secured by automatically setting the acoustic signal capable of maintaining the measurement stability.

In order to determine the measurement stability, the device 100 for space monitoring emits acoustic signals to the target space for a predetermined number of measurements in step S110, receives the acoustic signals of the target space in step S210, and measures a spatial frequency response for each acoustic signal in step S310, whereby a spectrum for each measured spatial frequency response may be identified.

In addition, in step S413, the device 100 for space monitoring may analyze a correlation or similarity between spectra for each measured spatial frequency response, and in step S415, may evaluate the measurement stability for the acoustic signal to be emitted.

As an example of the measurement stability, it will be described with reference to FIGS. 8A to 8C, which illustrate sound pressure spectrums as the spatial frequency responses.

Figure 8A:
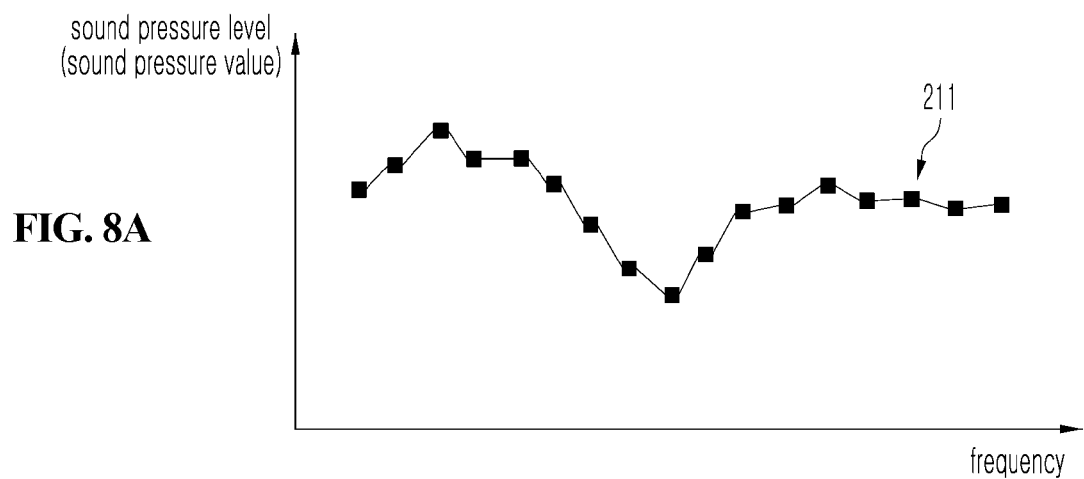
FIGS. 8A to 8C are views illustrating an example of evaluating the measurement stability in the method of automatically setting the acoustic signal according to the present disclosure.
Figure 8B:
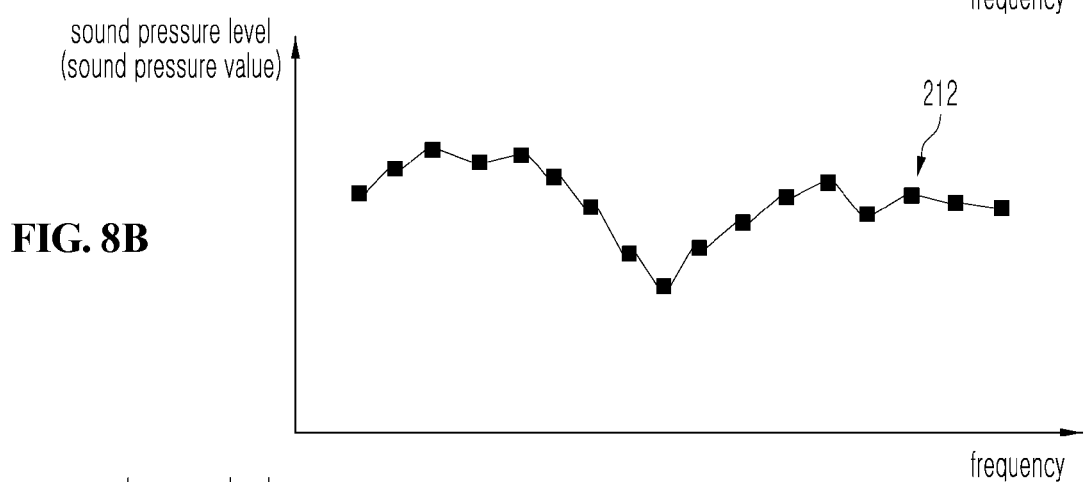

A case is assumed that a first sound pressure spectrum 211 as shown in FIG. 8A and a second sound pressure spectrum 212 as shown in FIG. 8B are obtained by repeatedly performing emission and reception of the same acoustic signals to the target space.

When a degree of similarity is determined by analyzing a correlation between the first sound pressure spectrum 211 and the second sound pressure spectrum 212, the degree of similarity may be evaluated to be similar to a reference value or more, so the measurement stability may be satisfied. When the measurement stability is satisfied to a predetermined level through repeated evaluation of the measurement stability with respect to the selected acoustic signal, the selected acoustic signal may be determined as an acoustic signal suitable for monitoring the target space.

Figure 8C:
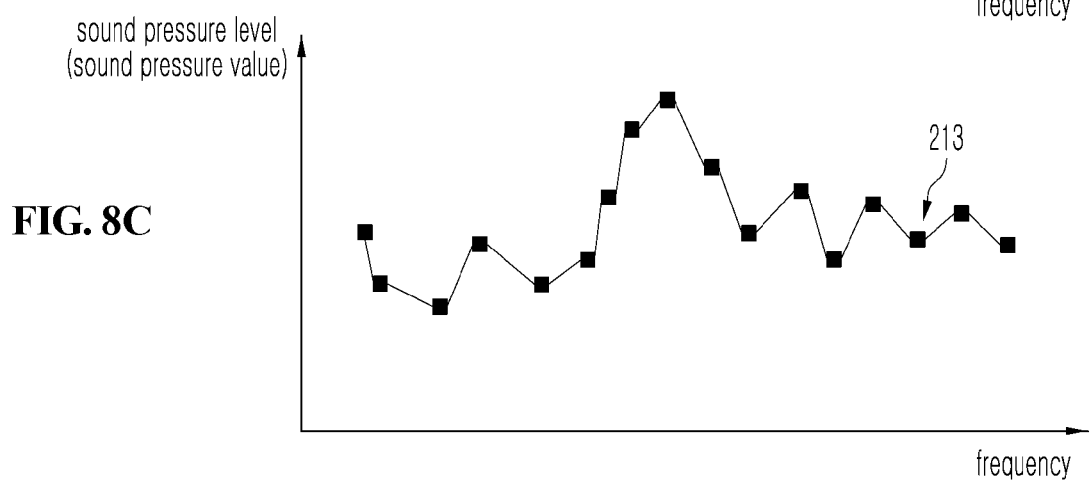

As a different case, it is assumed that the first sound pressure spectrum 211 as shown in FIG. 8A and a third sound pressure spectrum 213 as shown in FIG. 8C are obtained by repeatedly performing emission and reception of the same acoustic signals to the target space.

When a degree of similarity is determined by analyzing a correlation between the first sound pressure spectrum 211 and the third sound pressure spectrum 213, the degree of similarity may be evaluated as dissimilar as below a reference value, so the measurement stability may not be satisfied. In this case, the selected acoustic signal may be determined to be an unsuitable acoustic signal for monitoring the target space, and the device 100 for space monitoring may perform a process of resetting the acoustic signal.

As described above, through the repetitive evaluation of the measurement stability for the acoustic signal to be emitted to the target space, whether the acoustic signal is suitable for monitoring the target space may be determined and the acoustic signal may be reset according to the determination result.

Figure 9:
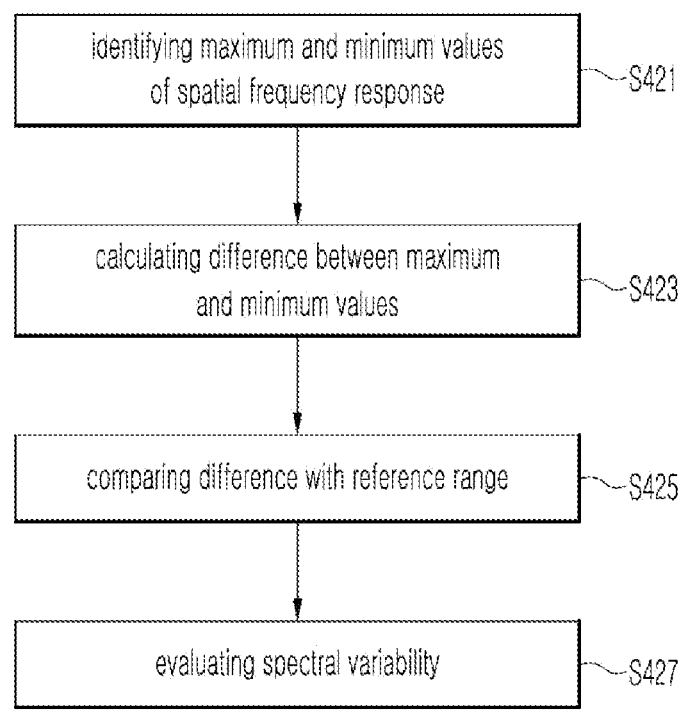
FIG. 9 is a flowchart illustrating an exemplary embodiment of a determination condition of spectral variability in the method of automatically setting the acoustic signal according to the present disclosure.

FIG. 9 is a flowchart illustrating an exemplary embodiment of a determination condition of spectral variability in the method of automatically setting the acoustic signal according to the present disclosure.

In selecting an acoustic signal, when the measured value of the spatial frequency response of the acoustic signal received by emitting the acoustic signal to the target space changes beyond a reference range, the acoustic signal may be determined to have spectral variability, but conversely, when the measured value of the spatial frequency response changes slightly below the reference range, the acoustic signal may be determined not to have the spectral variability, and such an acoustic signal is not suitable for identifying a spatial situation.

For example, taking a sound pressure spectrum as a spatial frequency response, a spatial situation may be identified by measuring a frequency shift in the sound pressure spectrum, and the measurement precision of the frequency shift may be improved as a difference between the maximum value and the minimum value of the sound pressure value that changes depending on the frequency increases. When the difference between the maximum and minimum values of the sound pressure values is so small that the sound pressure spectrum appears as a flat curve, precise measurement of the frequency shift may be difficult.

Therefore, it is necessary to select an acoustic signal in which the maximum and minimum values of the sound pressure values in the sound pressure spectrum differ by greater than or equal to the predetermined level.

For this reason, in the present disclosure, the precision of the device for space monitoring is to be secured by automatically selecting and setting the acoustic signal having the spectral variability greater than or equal to the predetermined level.

In order to determine the spectral variability, in step S421, the device 100 for space monitoring identifies the maximum and minimum values in the spectrum for the measured spatial frequency response.

In addition, in step S423, a difference between the maximum value and the minimum value is calculated, and in step S425, the difference is compared with the reference range, whereby in step S427, whereby the spectral variability of the acoustic signal to be emitted may be evaluated.

As an example of the evaluation of spectral variability, it will be described with reference to FIGS. 10A and 10B, which illustrate sound pressure spectrums as the spatial frequency responses.

Figure 10A:
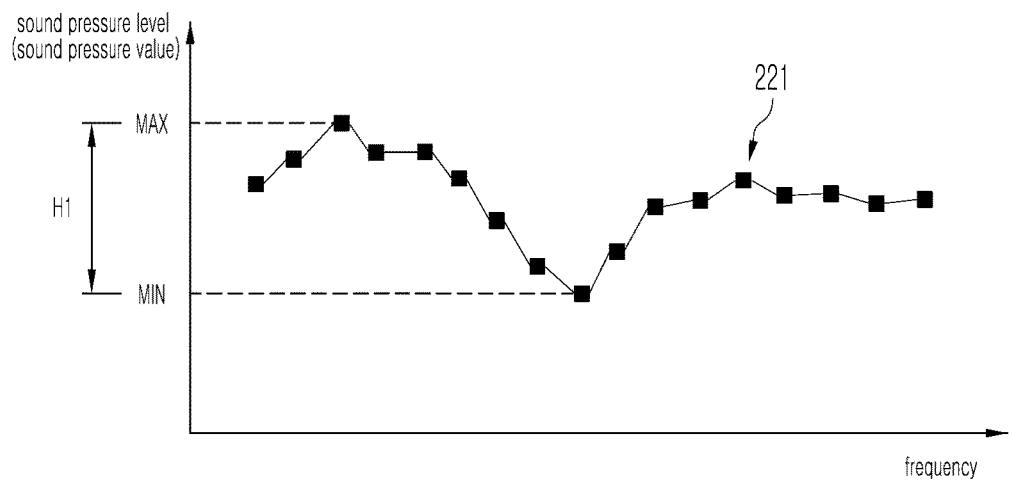
FIGS. 10A and 10B are views illustrating an example of evaluating the spectral variability in the method of automatically setting the acoustic signal according to the present disclosure.

It is assumed that a fourth sound pressure spectrum 221 as shown in FIG. 10A is obtained by emitting an acoustic signal to a target space and receiving the acoustic signal from the target space.

In the fourth sound pressure spectrum 221, when a maximum value MAX and a minimum value MIN of sound pressure values are determined and a difference value between the maximum value MAX and the minimum value MIN is calculated, the difference value is expressed as H1. When the difference value H1 satisfies a preset reference range, the spectral variability may be satisfied. When the spectral variability with respect to a selected acoustic signal is satisfied, the selected acoustic signal may be determined as an acoustic signal suitable for monitoring a target space.

Figure 10B:
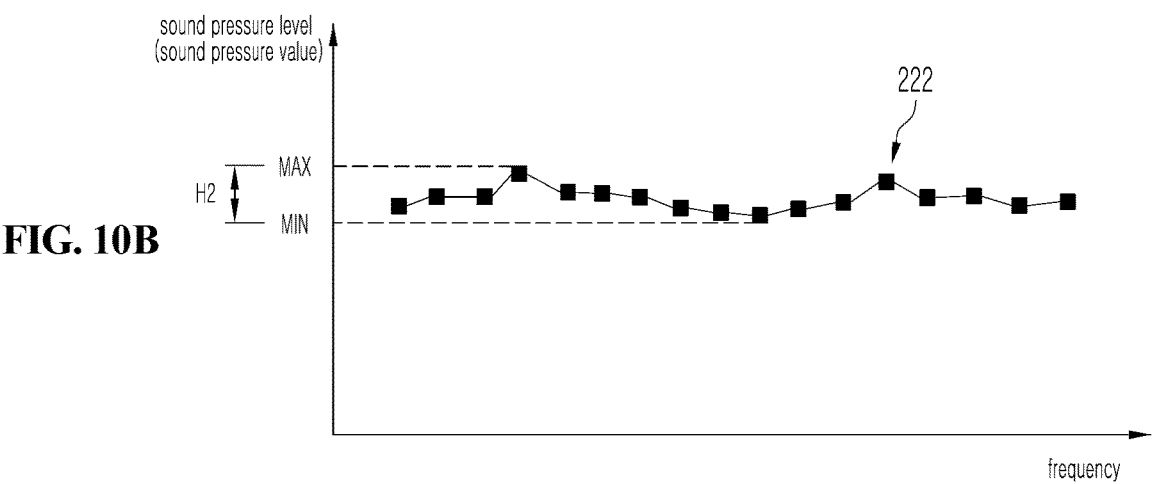

As a different case, it is assumed that a fifth sound pressure spectrum 222 as shown in FIG. 10B is obtained by emitting an acoustic signal to a target space and receiving the acoustic signal from the target space.

In the fifth sound pressure spectrum 222, when a maximum value MAX and a minimum value MIN of sound pressure values are determined and a difference value between the maximum value MAX and the minimum value MIN is calculated, the difference value is expressed as H2. When the difference value H2 does not satisfy the preset reference range, the spectral variability may not be satisfied. In this case, the selected acoustic signal may be determined to be an unsuitable acoustic signal for monitoring the target space, and the device 100 for space monitoring may perform a process of resetting the acoustic signal.

In the above, the difference between the maximum and minimum values of the spectrum sound pressure values is used as a criterion for determining the spectral variability. In addition, a degree of scattering and the like such as variance, standard deviation, mean deviation, and quartile deviation of the sound pressure value may be the criteria for determining the spectral variability.

As described above, through the evaluation of the spectral variability for the acoustic signal to be emitted to the target space, whether the acoustic signal is suitable for monitoring the target space may be determined and the acoustic signal may be reset according to the determination result.

Figure 11:
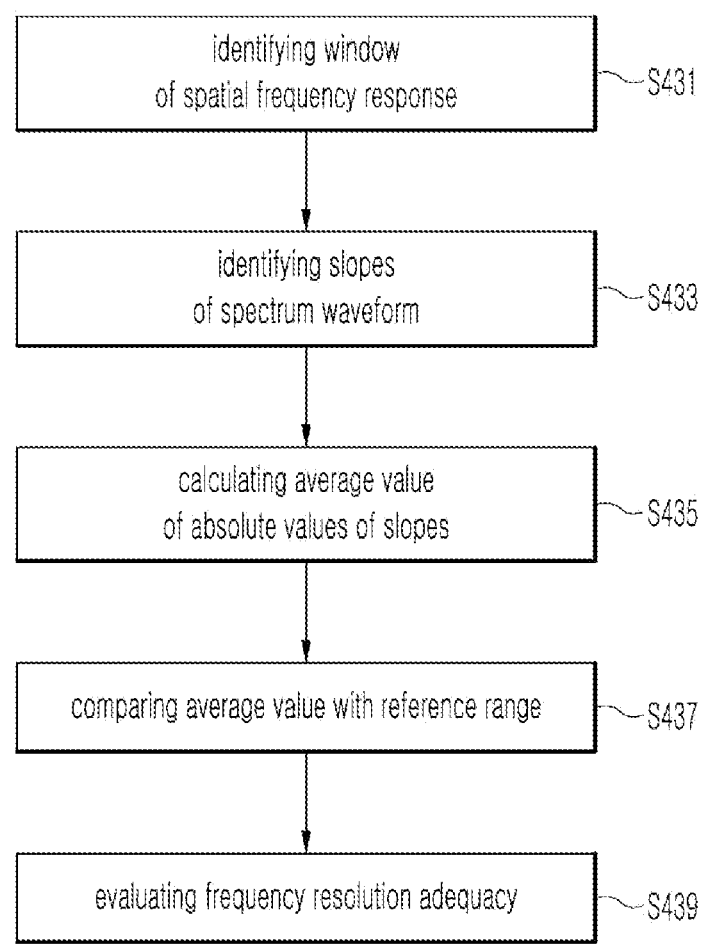
FIG. 11 is a flowchart illustrating an exemplary embodiment of a determination condition of frequency resolution adequacy in the method of automatically setting the acoustic signal according to the present disclosure.

FIG. 11 is a flowchart illustrating an exemplary embodiment of a determination condition of frequency resolution adequacy in the method of automatically setting the acoustic signal according to the present disclosure.

In selecting an acoustic signal, even though the above-described spectral variability is satisfied, when frequency resolution adequacy for the acoustic signal is not satisfied, an error may be included in measurement of the spatial frequency response.

Frequency resolution refers to a distance between a specific frequency and a nearest distinguishable frequency. In a case where a spatial frequency response is measured by emitting an acoustic signal of a synthesized sound composed of a frequency set including a plurality of frequency components, the measured sound pressure spectrum may be expressed as an integer number of frequencies as shown in FIGS. 10A and 10B. In this case, the distance between the frequencies may be the frequency resolution.

When the emitted sound is in a form of a sine sweep in which a single frequency changes linearly with time, the measured sound pressure spectrum may be displayed as a curve rather than an integer number of dots. However, even though the spectrum is expressed as the curve, in reality, the resolution, which is an ability to distinguish a specific frequency from the nearest frequency, is present. In this case, the resolution is determined according to factors such as performance of components constituting a monitoring device, or operation condition or data processing condition of the monitoring device. For example, an acoustic signal may be recorded by using a specific sampling rate in the step of receiving the acoustic signal. In this case, the sampling rate may affect the resolution. Alternatively, for example, the spectrum may be expressed by using a "moving average" technique as a method for removing unnecessary noise from the measured sound pressure spectrum. In this case, the resolution may be determined according to the size of a section where a value of the moving average is calculated.

In a case where too many numbers of peaks exist within a frequency band (i.e., a window) of a spectrum, the spectrum may not be accurately expressed unless sufficient resolution is secured. In this case, the spatial frequency response may be accurately measured only when the acoustic signal is changed so as to have the frequency resolution adequacy.

Figure 12A:
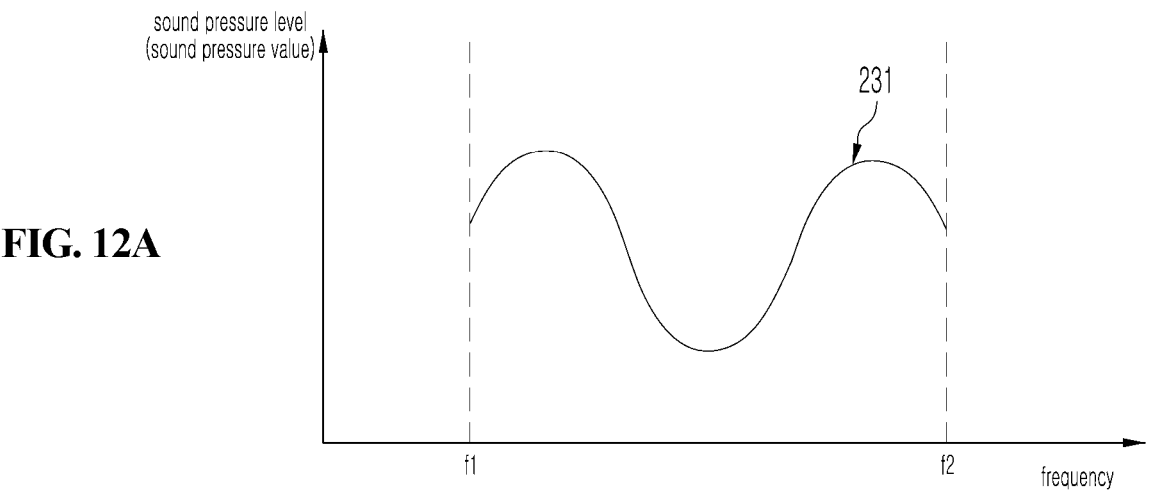
FIGS. 12A and 12B are views illustrating an example of evaluating the frequency resolution adequacy of the acoustic signal in the method of automatically setting the acoustic signal according to the present disclosure.
Figure 12B:
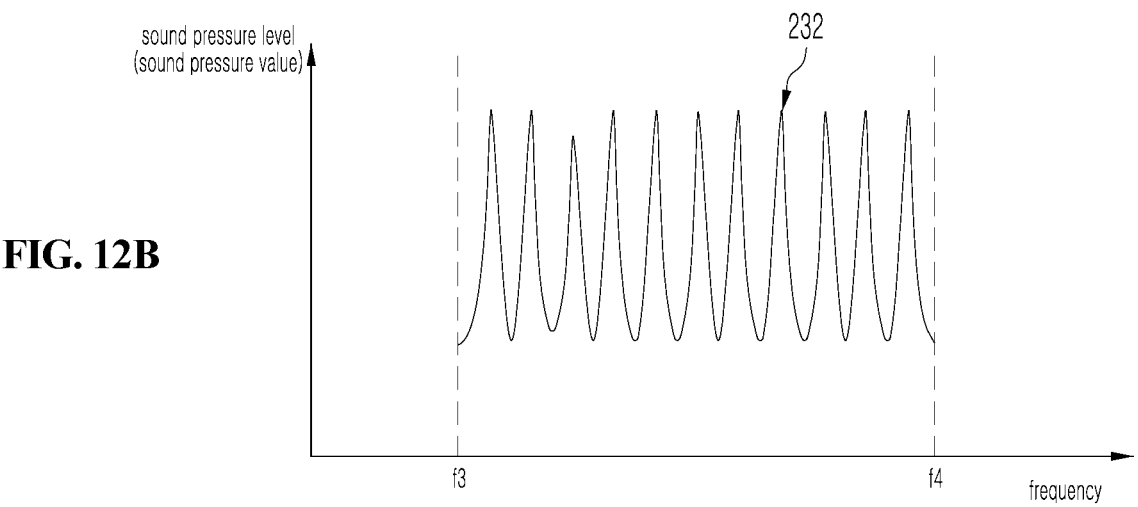

As an example, comparing and explaining FIGS. 12A and 12B, in both cases, the difference between the maximum and minimum values of sound pressure, that is, the spectral variability is the same. However, in FIG. 12A, the spectrum is relatively flat, that is, the number of peaks in a window is small. Whereas, in FIG. 12B, the number of peaks in the window is large. Therefore, in FIG. 12A, the spectrum may be expressed by, for example, 20 points by using 20 frequencies. However, in order to be able to adequately express the spectrum as shown in FIG. 12B, for example, 200 frequencies should be used to represent 200 dots, and thus the frequency interval or frequency resolution should be as narrow as that extent.

In the present disclosure, it is possible to evaluate frequency resolution adequacy and reset an acoustic signal accordingly. When it is evaluated that the frequency resolution is not adequate, the frequency resolution adequacy may be re-evaluated at a frequency of another band by changing a center frequency, or the frequency resolution (e.g., frequency interval) itself may be adjusted while leaving the center frequency as it is.

As an example, evaluation of the frequency resolution adequacy may be determined on the basis of a slope (i.e., a numerator is a frequency width and a denominator is a sound pressure width) of a spectrum. For example, in a case where one sound pressure spectrum is expressed as sound pressure values (i.e., coordinate values of the vertical axis) for N frequencies (i.e., coordinate values of the horizontal axis) having a frequency interval d, when an average of absolute values of slopes of the spectrum is small, that is, when the spectrum is flat as shown in FIG. 12A, even though the frequency interval d is large, the shape of the spectrum may be adequately expressed. Whereas, as the average of the absolute values of the slopes of the spectrum increases, that is, as there are a large number of peaks in the spectrum as shown in FIG. 12B, the frequency interval d should be sufficiently narrowed, and only then the spectrum may be fully expressed.

When the spectrum is expressed as the sound pressure values for N frequencies, there are N-1 absolute values p of the differences in sound pressure values between adjacent frequencies. When the sum of all N-1 numbers of p is divided by a window width d*(N-1), this division result may be the average of absolute values of the slopes of a spectral waveform. Meanwhile, when the spectrum is expressed as a curve, dividing, by the window width, the sum of the absolute values of the differences between the maximum and minimum values for a plurality of peaks existing in the spectrum, this division result becomes the average of the absolute values of the slopes of the spectrum.

Referring to FIG. 11 above, in order to select an acoustic signal through evaluating frequency resolution adequacy, the device 100 for space monitoring determines a window for the measured spatial frequency response in step S431, determines slopes of a spectral waveform in step S433, and calculates an average of the absolute values of the slopes in step S435. In addition, by comparing the calculated average value with the reference range in step S437, the frequency resolution adequacy may be evaluated in step S439.

As described above, through the evaluation of the frequency resolution adequacy for the acoustic signal to be emitted to the target space, whether the acoustic signal is suitable for monitoring the target space may be determined and the acoustic signal may be reset according to the determination result.

Figure 13A:
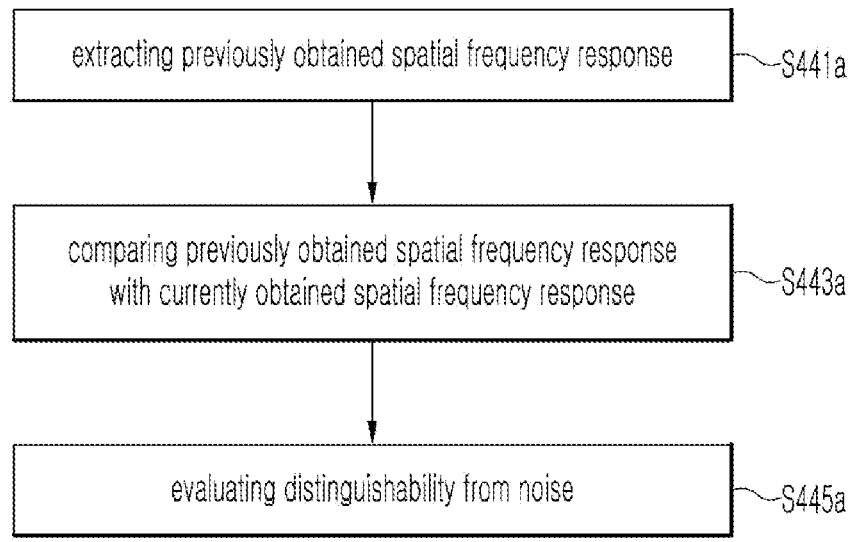
FIGS. 13A and 13B are flowcharts illustrating an exemplary embodiment of a determination condition of distinguishability from noise in the method of automatically setting the acoustic signal according to the present disclosure.
Figure 13B:
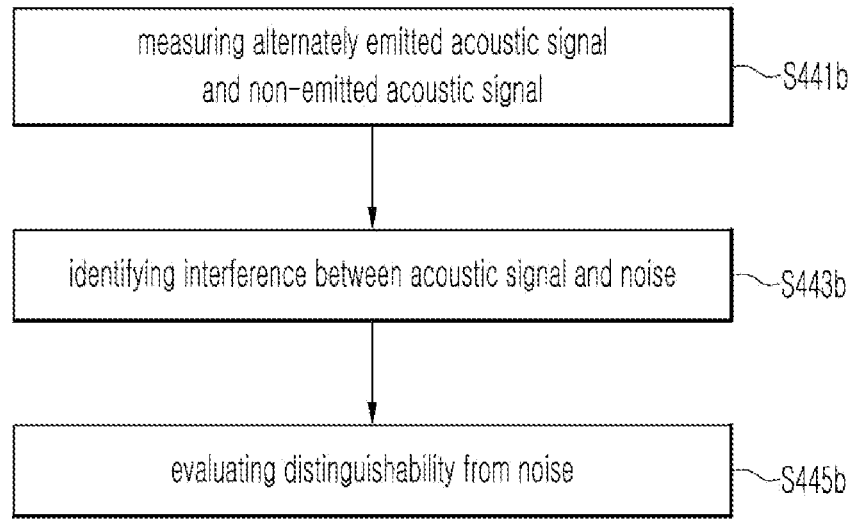

FIGS. 13A and 13B are flowcharts illustrating an exemplary embodiment of a determination condition of distinguishability from noise in the method of automatically setting the acoustic signal according to the present disclosure.

In selecting an acoustic signal, when noise existing in the target space and the emitted acoustic signal are similar to a predetermined level or more and interference between the acoustic signal and the noise is generated, a problem arises in which it is not possible to distinguish whether the spatial frequency response is a spatial frequency response obtained through the emitted acoustic signal or a spatial frequency response of the space where the interference with the noise is generated. Therefore, it is necessary to set the acoustic signal so as to avoid a noise section existing in the target space.

In addition, when a plurality of devices for space monitoring is installed in the target space, when mutually similar acoustic signals are emitted, the acoustic signals emitted by different devices for space monitoring may function as noise, so there is a need to set each device for space monitoring to emit a different acoustic signal.

Therefore, the objective of the present disclosure is to set an acoustic signal capable of avoiding the noise section by identifying noise in the target space and evaluating the distinguishability between the noise and the acoustic signal to be emitted.

A process for determining the distinguishability from the noise will be described with reference to two examples shown in FIGS. 13A and 13B.

As an example, in FIG. 13A illustrates a case where a spatial frequency response in which reliability is secured in advance is used. In step S443a, while retaining a spatial frequency response using an acoustic signal that is emitted in the absence of noise and for which the reliability is secured, the device 100 for space monitoring may extract the previously retained spatial frequency response when determining the distinguishability from noise.

In addition, in step S443a, the spatial frequency response measured by emitting and receiving the acoustic signal at the current time point is compared with the spatial frequency response in which the reliability is secured, and in step S445a, a degree of noise inflow and the distinguishability from the noise may be evaluated.

Figure 14:
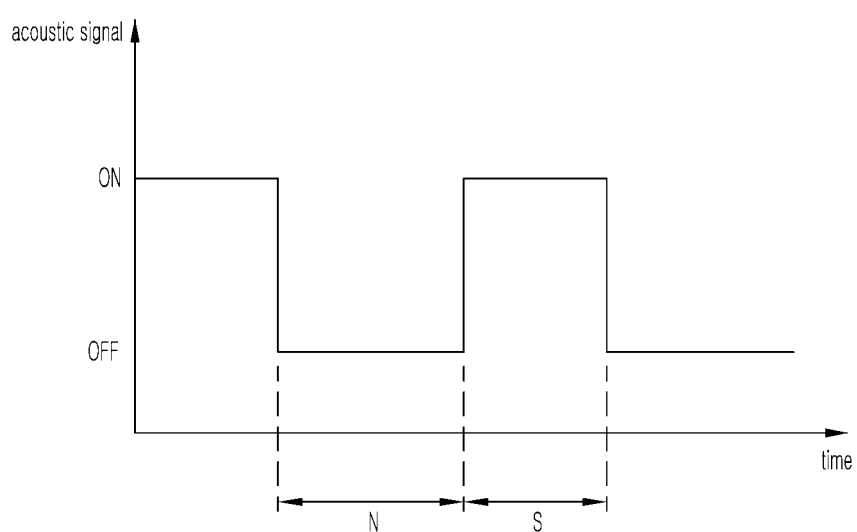
FIG. 14 is a view illustrating an example of operation relationship of the device for space monitoring for determining the distinguishability from the noise in the method of automatically setting the acoustic signal according to the present disclosure.

As another example, FIG. 13B illustrates a case where interference between the acoustic signal and noise is identified while performing identification of the interference by switching alternately between a section emitting an acoustic signal and a section not emitting an acoustic signal. As shown in FIG. 14, in step S441a, while switching alternately between an S section emitting the acoustic signal and an N section not emitting the acoustic signal, the device 100 for space monitoring measures the acoustic signal of the target space in the S section, and measures the noise of the target space in the N section. In addition, by comparing the degree of frequency interference between the acoustic signal for the S section and the noise for the N section in step S443a, the distinguishability from the noise may be evaluated in step S445a.

When the acoustic signal and the noise do not have the same frequency band, the selected acoustic signal may be determined as an acoustic signal suitable for monitoring the target space. Conversely, when the frequency bands of the acoustic signal and the noise are the same to each other over a predetermined level, the interference occurs between the acoustic signal and the noise, so the selected acoustic signal may be determined to be an acoustic signal that is not suitable for monitoring the target space, whereby the device 100 for space monitoring may perform the process of resetting the acoustic signal.

As described above, through the evaluation of the distinguishability from the noise for the acoustic signal to be emitted to the target space, whether acoustic signals are suitable for monitoring the target space may be determined and the acoustic signal may be reset according to the determination result.

By evaluating various determination conditions described above, the device 100 for space monitoring may reset the acoustic signal.

When resetting a monotone sound acoustic signal, the device 100 for space monitoring may reset the acoustic signal to be emitted by adjusting at least one or more of the frequency of the emission start point, the frequency of the emission end point, or the duration of the acoustic signal emission.

In addition, when resetting the acoustic signal of the synthesized sound composed of the frequency set including the plurality of frequency components, the device 100 for space monitoring may reset the acoustic signal to be emitted by adjusting at least one or more of the frequency interval, the center frequency, or the number of frequencies.

Furthermore, in the present disclosure, the device 100 for space monitoring may select the most optimal acoustic signal by retaining the plurality of acoustic signals and evaluating each acoustic signal on the basis of the determination conditions.

Figure 15:
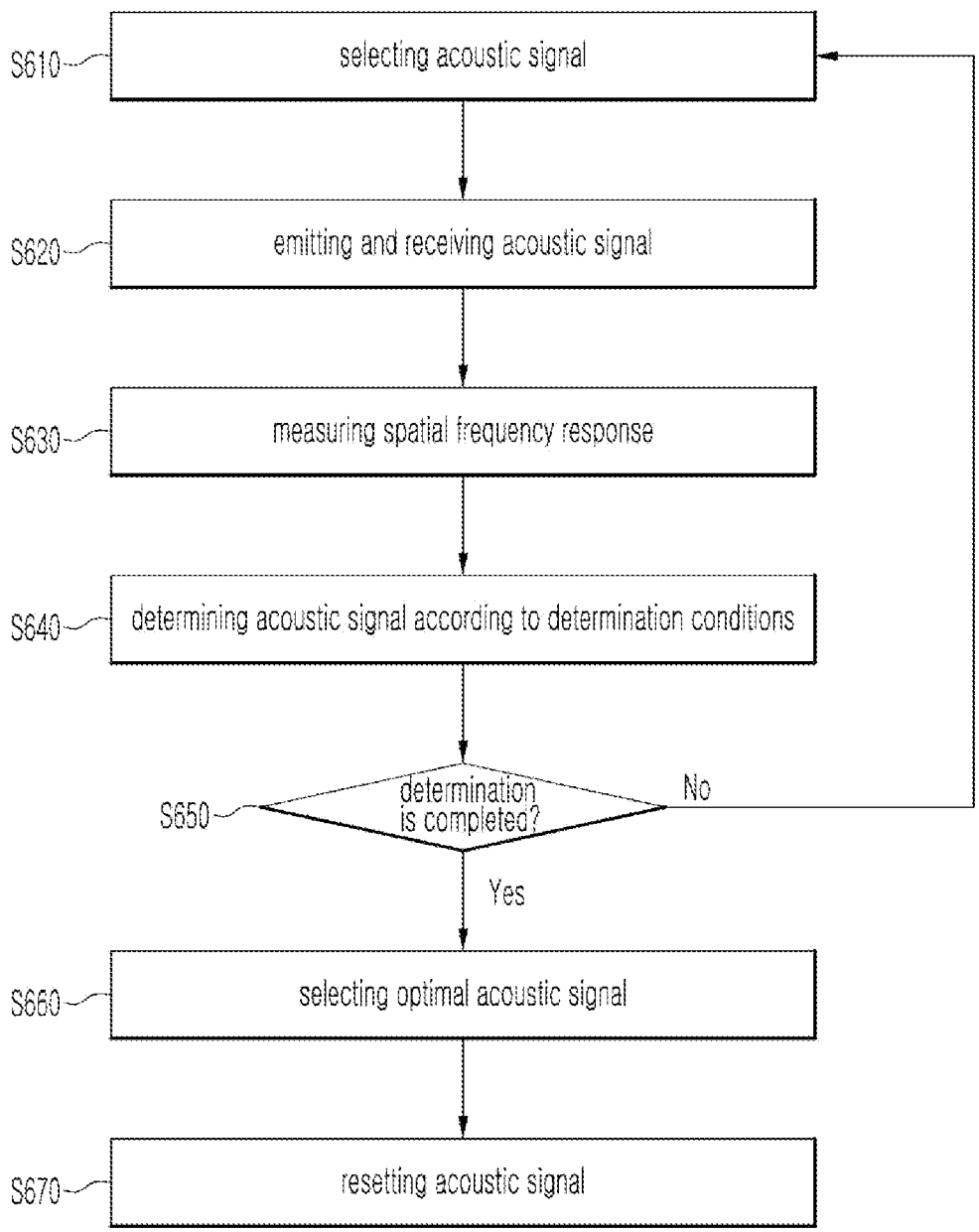
FIG. 15 is a flowchart illustrating an exemplary embodiment of a process of selecting an optimal acoustic signal from among a plurality of retained acoustic signals in the method of automatically setting the acoustic signal according to the present disclosure.

In this regard, FIG. 15 is a flowchart illustrating an exemplary embodiment of a process of selecting an optimal acoustic signal from among a plurality of retained acoustic signals in the method of automatically setting the acoustic signal according to the present disclosure.

The device 100 for space monitoring may select one of the retained acoustic signals in step S610 and emit the selected acoustic signal to the target space to receive the acoustic signal of the target space in step S620.

The device 100 for space monitoring may measure the spatial frequency response on the basis of the received acoustic signal in step S630 and evaluate the corresponding acoustic signal according to the determination conditions in step S640. Here, the determination conditions may include at least one or more of the measurement stability, spectral variability, frequency resolution adequacy, or distinguishability from noise, which are described above.

In addition, according to a decision as to whether the determination of some or all of the retained plurality of acoustic signals is completed or not in step S650, the device 100 for space monitoring may select another acoustic signal again and iteratively evaluate the acoustic signals according to the determination conditions. As an example, the device 100 for space monitoring may perform evaluation by extracting an acoustic signal having a center frequency spaced apart by a predetermined interval from among the plurality of retained acoustic signals.

Here, the plurality of acoustic signals retained by the device 100 for space monitoring may be various types of acoustic signals including: the plurality of acoustic signals different from each other and composed of the monotone sound whose frequency changes with time; the plurality of acoustic signals different from each other and composed of the synthesized sound provided with the frequency set including the plurality of frequency components; the plurality of acoustic signals different from each other and composed of the synthesized sound provided with the plurality of frequency sets whose frequencies change with time; and the plurality of acoustic signals different from each other, wherein the monotone sound and the synthesized sound are alternated.

In step S660, the device 100 for space monitoring may select the most optimal acoustic signal by evaluating the plurality of acoustic signals. As an example, on the basis of at least one or more determination conditions of the measurement stability, spectral variability, frequency resolution adequacy, or distinguishability from noise for the spatial frequency response measured corresponding to each acoustic signal, the performance value for each acoustic signal may be calculated, and the optimal acoustic signal may be determined by comparing the performance value calculated for each acoustic signal. As an example, a final performance value is calculated by multiplying or adding the evaluation values according to the evaluation of each determination condition for each acoustic signal, or the final performance value may be calculated by assigning a weight to each determination condition and adding the weight to each evaluation value according to the evaluation of each determination condition. In addition, an optimal acoustic signal may be determined by comparing each final performance value of each of the plurality of acoustic signals.

When the selected optimal acoustic signal is the previously emitted acoustic signal, there is no need to reset the acoustic signal. However, in step S670, when the acoustic signal is different from the previously emitted acoustic signal, the device 100 for space monitoring may reset the acoustic signal to be emitted as the selected optimal acoustic signal.

Through such a process, the device 100 for space monitoring may perform monitoring of the target space by resetting the acoustic signal to an acoustic signal optimized for monitoring the corresponding target space among the plurality of retained acoustic signals.

In the above, the case for the first method has been described, wherein whether to reset the acoustic signal is determined on the basis of one or more determination criteria by using the measured spatial frequency response. Meanwhile, in order to determine whether to reset the acoustic signal or not, as in the first method described above, the measured spatial frequency response, that is, the spectrum expressed in the frequency domain may be used, but the second method of determining whether to reset the acoustic signal by using the acoustic signal itself received from the time domain may also be applied.

The second method may be applied to the acoustic signal of the synthesized sound composed of the frequency set including the plurality of frequency components, but for convenience, hereinafter, a case in which a monotone sound acoustic signal whose frequency is changed with time is used will be described as a reference.

In such a second method, an acoustic signal received for a predetermined time or an acoustic signal received in real time from the time domain may be determined according to determination criteria such as the measurement stability, spectral variability, frequency resolution adequacy, or distinguishability from noise, and thus whether to reset the acoustic signal may be determined.

For example, in order to determine the measurement stability, the similarity between the acoustic signals received iteratively by a predetermined number of times from the time domain is determined, so that the measurement stability is determined, whereby whether to reset the acoustic signal may be determined on the basis of the measurement stability.

As an example, in order to determine the spectral variability, a difference between the maximum value and the minimum value of the sound pressure received in real time from the time domain may be identified, and the spectral variability may be evaluated by comparing the difference with the reference range.

As another example, in order to determine the frequency resolution adequacy, slopes of the fluctuation degree of sound pressure received for a predetermined time from the time domain are identified and compared with the reference range, so that the frequency resolution adequacy may be evaluated.

As yet another example, the distinguishability from the noise may be evaluated by comparing the received acoustic signal with the previously received acoustic signal, or by comparing the received acoustic signal with the noise received from the section where the acoustic signal is not emitted.

When determining whether to reset the acoustic signal on the basis of various determination criteria as described above, the determination step is not necessarily performed after measuring the spatial frequency response through the first method, but in some cases, without going through the process of measuring the spatial frequency response, whether to reset the acoustic signal may be determined, on the basis of the determination criteria, by evaluating the acoustic signal itself, which is received in real time from the time domain, or by evaluating the received acoustic signal according to the second method.

According to the present disclosure as described above, the acoustic signal may be automatically reset to reach optimal detection performance in consideration of various factors such as the shape of the target space, the installation location of the device for space monitoring, and the changes in the arrangement of fixed objects in the target space.

In particular, the acoustic signal capable of exhibiting the optimal performance may be automatically set by solving the problem in which it is difficult for the user to identify the appropriate acoustic signal.

The situation of the target space may be more precisely detected through the automatic resetting of such an acoustic signal.

Although exemplary aspects of the present disclosure have been described for illustrative purposes, those skilled in the art will appreciate that various modifications, additions and substitutions are possible, without departing from essential characteristics of the disclosure. Therefore, the embodiments described in the present disclosure are not intended to limit the technical idea of the present disclosure but to describe the present disclosure, and the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A method of automatically setting a monitoring acoustic signal of a device for space monitoring, the method comprising:
   emitting a candidate acoustic signal to a target space for monitoring;
   receiving an acoustic signal from the target space;
   measuring a spatial frequency response of the target space using the received acoustic signal;
   calculating a performance value of the candidate acoustic signal on the basis of a determination condition,
   wherein the emitting of the candidate acoustic signal, the receiving of the acoustic signal, measuring of the spatial frequency response, and the calculating of the performance value are performed for each of a plurality of candidate acoustic signals, and
   setting one candidate acoustic signal, among the plurality of candidate acoustic signals, that is determined by comparing the performance values of the plurality of candidate acoustic signals, as the monitoring acoustic signal.

2. The method of claim 1, wherein, in the calculating of the performance value, the determination condition includes at least one of measurement stability, spectral variability, frequency resolution adequacy, and distinguishability from noise.

3. The method of claim 1, wherein the emitting of the candidate acoustic signal, the receiving of the acoustic signal, and the measuring of the spatial frequency response are iteratively performed for the candidate acoustic signal, and wherein in the calculating of the performance value of the candidate acoustic signal, measurement stability is calculated, as a performance value, on the basis of similarity among a plurality of spatial frequency responses, which are iteratively measured for the candidate acoustic signal.

4. The method of claim 1, wherein, in the calculating of the performance value of the candidate acoustic signal, a difference between maximum and minimum values or a degree of scattering of the measured spatial frequency response is compared with a reference range, so as to calculate spectral variability as a performance value of the candidate acoustic signal.

5. The method of claim 1, wherein, in the calculating of the performance value of the candidate acoustic signal, frequency resolution adequacy is calculated, as a performance value, on the basis of slopes of a spectrum waveform in the measured spatial frequency response.

6. The method of claim 1, wherein, in the calculating of the performance value of the candidate acoustic signal, distinguishability from noise is calculated, as a performance value, through comparing the measured spatial frequency response with a previously obtained spatial frequency response or through analyzing a noise measured without the emitted acoustic signal.

7. The method of claim 1, wherein the plurality of candidate acoustic signals include monotone sound signals each of which a frequency change with time, which are different from each other at least one of a minimum frequency, a maximum frequency, and a duration of acoustic signal emission.

8. The method of claim 1, wherein the plurality of candidate acoustic signals include synthesized sound signals of multiple frequency components, which are different from each other at least one of a frequency interval, a center frequency, and the number of frequencies of the frequency components.

9. A method of automatically setting a monitoring acoustic signal of a device for space monitoring, the method comprising:
emitting a candidate acoustic signal to a target space for monitoring;
receiving an acoustic signal from the target space;
calculating a performance value of the candidate acoustic signal on the basis of a determination condition,
wherein the emitting of the candidate acoustic signal, the receiving of the acoustic signal, and the calculating of the performance value are performed for each of a plurality of candidate acoustic signals, and
setting one candidate acoustic signal, among the plurality of candidate acoustic signals, that is determined by comparing the performance values of the plurality of candidate acoustic signals, as the monitoring acoustic signal.

10. The method of claim 9, wherein the emitting of the candidate acoustic signal and the receiving an acoustic signal from the target space are iteratively performed for each of the plurality of candidate acoustic signals, and
wherein in the calculating of the performance value of the candidate acoustic signal, measurement stability is calculated, as a performance value, on the basis of similarity among the received acoustic signals, which are iteratively received in a time domain for the candidate acoustic signal.

11. The method of claim 9, wherein, in the calculating of the performance value of the candidate acoustic signal, distinguishability from noise of the candidate acoustic signal is calculated, as the performance value, through comparing the received acoustic signal with a previously received acoustic signal or through analyzing a noise measured without the emitted acoustic signal.

12. A method of operating a device for space monitoring, the method comprising:
emitting a first monitoring acoustic signal, which is a monotone sound signal whose frequency changes with time, to a target space for monitoring;
receiving an acoustic signal from the target space;
calculating a performance value of the first monitoring acoustic signal on the basis of a determination condition;
determining whether to reset the first monitoring acoustic signal, by comparing the performance value of the first monitoring acoustic signal with a reference performance value,
resetting the first monitoring acoustic signal to a second monitoring acoustic signal, which is different from the first monitoring acoustic signal with respect to at least one of a minimum frequency, a maximum frequency and a duration of acoustic signal emission, according to the determining of whether to reset the first monitoring acoustic signal.

13. The method of claim 12, wherein, in the calculating of the performance value, the determination condition includes at least one of measurement stability, spectral variability, frequency resolution adequacy, and distinguishability from noise.

14. The method of claim 12, wherein the emitting the first monitoring acoustic signal and the receiving of the acoustic signal are iteratively performed for the first monitoring acoustic signal, and
wherein in the calculating of the performance value of the first monitoring acoustic signal, measurement stability is calculated, as a performance value, on the basis of similarity among a plurality of the received acoustic signals.

15. A method of operating a device for space monitoring, the method comprising:
emitting a first monitoring acoustic signal, which is a synthesized sound signal of multiple frequency components, to a target space for monitoring;
receiving an acoustic signal from the target space;
measuring a spatial frequency response of the target space using the received acoustic signal;
calculating a performance value of the first monitoring acoustic signal on the basis of a determination condition;

determining whether to reset the first monitoring acoustic signal, by comparing the performance value of the first monitoring acoustic signal with a reference performance value, resetting the first monitoring acoustic signal to a second monitoring acoustic signal, which is different from the first monitoring acoustic signal with respect to at least one of a frequency interval, a center frequency, and the number of frequencies of the frequency components, according to the determining of whether to reset the first monitoring acoustic signal.

16. The method of claim 15, wherein, in the calculating a performance value, the determination condition includes at least one of measurement stability, spectral variability, frequency resolution adequacy, and distinguishability from noise.

17. The method of claim 15, wherein the emitting the first monitoring acoustic signal, the receiving of the acoustic signal, and the measuring of the spatial frequency response are iteratively performed for the first monitoring acoustic signal, and wherein in the calculating a performance value of the first monitoring acoustic signal, measurement stability is calculated, as a performance value, on the basis of similarity among a plurality of spatial frequency responses.

* * * * *